(12) United States Patent
Ou

(10) Patent No.: US 11,180,246 B2
(45) Date of Patent: Nov. 23, 2021

(54) AERIAL VEHICLE AND A SIGNAL LINE PROTECTION ASSEMBLY THEREOF

(71) Applicant: SZ DJI TECHNOLOGY CO., LTD., Shenzhen (CN)

(72) Inventor: Di Ou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 51 days.

(21) Appl. No.: 16/725,452

(22) Filed: Dec. 23, 2019

(65) Prior Publication Data

US 2020/0148341 A1 May 14, 2020

Related U.S. Application Data

(63) Continuation of application No. 16/297,193, filed on Mar. 8, 2019, now Pat. No. 10,513,329, which is a continuation of application No. 15/816,353, filed on Nov. 17, 2017, now Pat. No. 10,227,131, which is a continuation of application No. 15/388,439, filed on
(Continued)

(51) Int. Cl.
*B64C 25/52* (2006.01)
*H02G 3/04* (2006.01)
*B64C 1/36* (2006.01)
*B64C 25/06* (2006.01)
(Continued)

(52) U.S. Cl.
CPC ............... *B64C 25/52* (2013.01); *B64C 1/36* (2013.01); *B64C 25/06* (2013.01); *B64C 25/60* (2013.01); *B64C 39/024* (2013.01); *H02G 3/04* (2013.01); *H02G 3/0406* (2013.01); *H02G 3/0462* (2013.01); *B64C 2201/027* (2013.01);
(Continued)

(58) Field of Classification Search
CPC ........... B64C 25/52; B64C 1/36; B64C 25/06; B64C 25/60; B64C 39/024; B64C 2201/027; B64C 2201/042; B64C 2201/108; H02G 3/0406; H02G 3/0462; H02G 3/04; B64D 2221/00
See application file for complete search history.

(56) References Cited

U.S. PATENT DOCUMENTS

| | | |
|---|---|---|
| 1,919,121 A | 7/1933 | Oehmichen |
| 1,950,915 A | 3/1934 | Lado-Bordowsky |

(Continued)

FOREIGN PATENT DOCUMENTS

| | | |
|---|---|---|
| CN | 1639500 A | 7/2005 |
| CN | 101314409 A | 12/2008 |

(Continued)

OTHER PUBLICATIONS

European Patent Office (EPO) The Extended European Search Report for 14896036.2 dated May 9, 2017 9 Pages.
(Continued)

*Primary Examiner* — Assres H Woldemaryam
(74) *Attorney, Agent, or Firm* — Anova Law Group, PLLC

(57) ABSTRACT

A signal line protection assembly of an aerial vehicle includes a foot stand and a protection sleeve. The foot stand includes a foot stand sleeve and a lower cover including an antenna compartment configured to receive an antenna of the aerial vehicle. The protection sleeve is configured to receive a signal line. At least a portion of the protection sleeve is received in the foot stand sleeve. The signal line includes a data line for the antenna.

20 Claims, 2 Drawing Sheets

Related U.S. Application Data

Dec. 22, 2016, now Pat. No. 9,896,195, which is a continuation of application No. PCT/CN2014/080845, filed on Jun. 26, 2014.

(51) Int. Cl.
*B64C 25/60* (2006.01)
*B64C 39/02* (2006.01)

(52) U.S. Cl.
CPC .. *B64C 2201/042* (2013.01); *B64C 2201/108* (2013.01); *B64D 2221/00* (2013.01)

(56) References Cited

U.S. PATENT DOCUMENTS

| | | | |
|---|---|---|---|
| 2,157,963 A | 5/1939 | Mercier | |
| 2,478,847 A | 8/1949 | Stuart | |
| 2,659,553 A | 11/1953 | Neville | |
| 2,927,742 A | 3/1960 | Overman | |
| 2,927,747 A * | 3/1960 | Bennie | B64C 25/52 244/17.17 |
| 3,002,712 A * | 10/1961 | Beckwith | B64C 27/20 244/17.23 |
| 3,185,409 A | 5/1965 | Jacobsen | |
| 3,873,049 A | 3/1975 | Horsdal | |
| 3,889,902 A | 6/1975 | Madet | |
| 4,161,843 A | 9/1979 | Hui | |
| 4,591,112 A | 5/1986 | Piasecki et al. | |
| 6,655,631 B2 | 12/2003 | Austen-Brown | |
| 6,719,244 B1 * | 4/2004 | Gress | B64C 29/0033 244/17.25 |
| 6,978,969 B1 | 12/2005 | Neal | |
| 7,128,293 B2 | 10/2006 | Isley | |
| 7,364,114 B2 | 4/2008 | Wobben | |
| 7,699,260 B2 | 4/2010 | Hughey | |
| D628,658 S * | 12/2010 | Wurm | D21/442 |
| 7,959,104 B2 | 6/2011 | Kuntz | |
| 7,997,526 B2 | 8/2011 | Greenley | |
| 8,167,234 B1 | 5/2012 | Moore | |
| 8,172,173 B2 | 5/2012 | Carlson | |
| 8,187,049 B2 | 5/2012 | Corsiglia et al. | |
| 8,292,215 B2 | 10/2012 | Olm et al. | |
| 8,328,130 B2 | 12/2012 | Goossen | |
| 8,342,441 B2 | 1/2013 | Yoeli | |
| 8,453,962 B2 | 6/2013 | Shaw | |
| 8,602,348 B2 | 12/2013 | Bryant | |
| 8,646,720 B2 | 2/2014 | Shaw | |
| 8,931,730 B2 | 1/2015 | Wang et al. | |
| 9,033,276 B1 * | 5/2015 | Calvert | B64C 25/10 244/102 R |
| 9,099,902 B2 * | 8/2015 | Chen | H02K 5/22 |
| 9,242,714 B2 | 1/2016 | Wang et al. | |
| 9,242,729 B1 | 1/2016 | Wang et al. | |
| 9,260,184 B2 * | 2/2016 | Olm | B64C 39/024 |
| D751,491 S * | 3/2016 | Chen | D12/319 |
| 9,284,052 B1 | 3/2016 | Wang et al. | |
| 9,493,225 B2 | 11/2016 | Wang et al. | |
| 9,527,588 B1 | 12/2016 | Rollefstad | |
| 2002/0104922 A1 | 8/2002 | Nakamura | |
| 2003/0094537 A1 | 5/2003 | Austen-Brown | |
| 2005/0061910 A1 * | 3/2005 | Wobben | B64C 27/20 244/17.23 |
| 2007/0158494 A1 | 7/2007 | Burrage | |
| 2009/0283629 A1 * | 11/2009 | Kroetsch | A63H 27/12 244/17.23 |
| 2010/0051740 A1 | 3/2010 | Yoeli | |
| 2010/0108801 A1 | 5/2010 | Olm et al. | |
| 2011/0017865 A1 | 1/2011 | Achtelik et al. | |
| 2011/0243734 A1 | 10/2011 | Schmaling et al. | |
| 2011/0315806 A1 | 12/2011 | Piasecki et al. | |
| 2012/0083945 A1 | 4/2012 | Oakley et al. | |
| 2012/0160962 A1 | 6/2012 | Holvoet et al. | |
| 2012/0241555 A1 * | 9/2012 | Savoye | A63H 27/12 244/54 |
| 2012/0261523 A1 | 10/2012 | Shaw | |
| 2012/0273608 A1 | 11/2012 | Jess et al. | |
| 2012/0298793 A1 | 11/2012 | Weddendorf et al. | |
| 2012/0298796 A1 * | 11/2012 | Carreker | B64G 1/22 244/100 R |
| 2013/0105635 A1 * | 5/2013 | Alzu'bi | B64C 39/024 244/23 A |
| 2013/0206915 A1 | 8/2013 | Desaulniers | |
| 2013/0287577 A1 | 10/2013 | Lin et al. | |
| 2014/0034775 A1 | 2/2014 | Hutson | |
| 2014/0061376 A1 | 3/2014 | Fisher et al. | |
| 2014/0117149 A1 * | 5/2014 | Zhou | A63H 27/12 244/17.23 |
| 2014/0151496 A1 | 6/2014 | Shaw | |
| 2014/0263823 A1 * | 9/2014 | Wang | B64C 1/063 244/17.23 |
| 2015/0012154 A1 | 1/2015 | Senkel et al. | |
| 2015/0069174 A1 * | 3/2015 | Wang | B64C 25/06 244/17.17 |
| 2015/0298788 A1 | 10/2015 | Wang et al. | |
| 2016/0023744 A1 | 1/2016 | Wang et al. | |
| 2016/0137298 A1 | 5/2016 | Youngblood | |
| 2017/0096210 A1 | 4/2017 | Wang et al. | |
| 2017/0101174 A1 * | 4/2017 | Ou | B64C 39/024 |
| 2017/0144741 A1 | 5/2017 | Wang et al. | |
| 2018/0273165 A1 * | 9/2018 | Song | B64C 27/08 |

FOREIGN PATENT DOCUMENTS

| | | |
|---|---|---|
| CN | 201367115 Y | 12/2009 |
| CN | 201604793 U | 10/2010 |
| CN | 102180267 A | 9/2011 |
| CN | 102358420 A | 2/2012 |
| CN | 102381471 A | 3/2012 |
| CN | 202244078 U | 5/2012 |
| CN | 102490896 A | 6/2012 |
| CN | 101992854 B | 11/2012 |
| CN | 202670095 U | 1/2013 |
| CN | 203047530 A | 7/2013 |
| CN | 103350752 A | 10/2013 |
| CN | 203246584 U | 10/2013 |
| CN | 203306225 U | 11/2013 |
| CN | 103786878 A | 5/2014 |
| CN | 103863552 A | 6/2014 |
| CN | 103921933 A | 7/2014 |
| DE | 10209881 A1 | 9/2003 |
| DE | 102004063205 B3 | 5/2006 |
| DE | 102005014948 A1 | 10/2006 |
| DE | 102012001797 A1 | 8/2013 |
| EP | 2416463 A2 | 2/2012 |
| EP | 2933189 A1 | 10/2015 |
| FR | 378030 A | 9/1907 |
| FR | 2637832 A1 | 4/1990 |
| FR | 2960736 A1 | 12/2011 |
| GB | 2483881 A | 3/2012 |
| JP | S3925328 B | 11/1964 |
| JP | 2007535438 A | 12/2007 |
| JP | 2008120294 A | 5/2008 |
| JP | 2013531573 A | 8/2013 |
| KR | 20120060590 A | 6/2012 |
| KR | 20130130116 A | 12/2013 |
| WO | 03074924 A1 | 9/2003 |
| WO | 2009095696 A2 | 8/2009 |
| WO | 2010068194 A1 | 6/2010 |
| WO | 2011131733 A2 | 10/2011 |

OTHER PUBLICATIONS

European Patent Office (EPO) The Extended European Search Report for 13826711.7 dated May 13, 2015 6 Pages.
The World Intellectual Property Organization (WIPO) International Search Report for PCT/CN2013/090470 dated Apr. 3, 2014 6 Pages.
United States Patent and Trademark Office (USPTO) Office Action for U.S. Appl. No. 14/167,679 dated Jun. 25, 2014 9 Pages.
United States Patent and Trademark Office (USPTO) Notice of Allowance for U.S. Appl. No. 14/565,119 dated Sep. 25, 2015 11 Pages.

(56) References Cited

OTHER PUBLICATIONS

United States Patent and Trademark Office (USPTO) Office Action for U.S. Appl. No. 14/639,550 dated Jul. 28, 2015 8 Pages.
United States Patent and Trademark Office (USPTO) Notice of Allowance for U.S. Appl. No. 14/944,042 dated Jan. 21, 2016 8 Pages.
United States Patent and Trademark Office (USPTO) Notice of Allowance for U.S. Appl. No. 15/012,068 dated Sep. 29, 2016 10 Pages.
United States Patent and Trademark Office (USPTO) Notice of Allowance for U.S. Appl. No. 15/294,517 dated Apr. 7, 2017 8 Pages.
United States Patent and Trademark Office (USPTO) Notice of Allowance for U.S. Appl. No. 15/405,140 dated Apr. 5, 2017 12 Pages.
Spinka Ondrej, "RAMA—a Low-Cost Modular Control System for Unmanned Aerial Vehicles", 2009, p. 46.
The World Intellectual Property Organization (WIPO) International Search Report for PCT/CN2014/080845 dated Mar. 2, 2015 5 Pages.
The United States Patent Office (USPTO) Notice of Allowance for U.S. Appl. No. 15/405,140 dated Apr. 20, 2017 2 Pages.
The United States Patent Office (USPTO) Notice of Allowance for U.S. Appl. No. 15/294,517 dated Jul. 18, 2017 5 Pages.
The United States Patent Office (USPTO) Notice of Allowance for U.S. Appl. No. 15/405,140 dated Jul. 26, 2017 5 Pages.
The United States Patent Office (USPTO) Notice of Allowance for U.S. Appl. No. 14/167,679 dated Oct. 28, 2014 14 Pages.
The United States Patent Office (USPTO) Notice of Allowance for U.S. Appl. No. 14/639,550 dated Oct. 28, 2015 9 Pages.
The United States Patent Office (USPTO) Notice of Allowance for U.S. Appl. No. 14/167,679 dated Nov. 21, 2014 11 Pages.

* cited by examiner

AERIAL VEHICLE AND A SIGNAL LINE PROTECTION ASSEMBLY THEREOF

CROSS-REFERENCE TO RELATED APPLICATIONS

This is a continuation application of U.S. patent application Ser. No. 16/297,193, filed on Mar. 8, 2019, which is a continuation application of U.S. patent application Ser. No. 15/816,353, filed on Nov. 17, 2017, now U.S. Pat. No. 10,227,131, which is a continuation application of U.S. patent application Ser. No. 15/388,439, filed on Dec. 22, 2016, now U.S. Pat. No. 9,896,195, which is a continuation application of International Application No. PCT/CN2014/080845, filed on Jun. 26, 2014, the entire contents of all of which are incorporated herein by reference.

TECHNICAL FIELD

The present disclosure relates to an unmanned aerial vehicle (UAV), and more particularly, to an aerial vehicle and a signal line protection assembly thereof.

BACKGROUND

An unmanned aerial vehicle is supported on the ground by foot stands before it takes off. The flight of UAV completes after the foot stands touch the ground in landing. A plurality of signal lines are introduced since the foot stands may be provided with various components including propulsion systems, electronic speed controllers, etc. In conventional technologies, the signal lines are disposed along an exterior of the foot stands, making them vulnerable to damages from external environment.

SUMMARY

The present disclosure provides an aerial vehicle and a signal line protection assembly thereof to solve the problem in the existing technologies that a signal line is vulnerable to damages from external environment.

In accordance with the present disclosure, there is provided a signal line protection assembly for an aerial vehicle. The signal line protection assembly includes a foot stand and a protection sleeve configured to receive a signal line. The foot stand includes a foot stand sleeve. At least a portion of the protection sleeve is received in the foot stand sleeve.

In some embodiments, the foot stand sleeve includes a bearing member and a receiving portion. A first side of the bearing member is configured to bear a propulsion system for driving a rotor. The receiving portion is provided at a second side of the bearing member and configured to receive and fix the protection sleeve.

In some embodiments, the receiving portion is a first receiving portion provided at a first end of the second side of the bearing member. The foot stand sleeve further includes a second receiving portion provided at a second end of the second side of the bearing member.

In some embodiments, the protection sleeve is fixed to the receiving portion by glue provided at a position where the protection sleeve contacts the receiving portion.

In some embodiments, the protection sleeve includes a wire inlet configured to allow the signal line to enter the protection sleeve, and the bearing member includes a wire outlet at a position corresponding to an end of the protection sleeve and configured to allow the signal line to be led out of the protection sleeve.

In some embodiments, the foot stand includes an electronic speed controller compartment disposed below the bearing member and configured to receive an electronic speed controller of the aerial vehicle. The receiving portion of the foot stand sleeve is received in the electronic speed controller compartment, such that the protection sleeve is at least partially received in the electronic speed controller compartment.

In some embodiments, the foot stand comprises a lower cover below the electronic speed controller compartment. One end of the lower cover is connected with one end of the electronic speed controller compartment. The lower cover includes an antenna compartment configured to receive an antenna for receiving an external signal.

In some embodiments, the protection sleeve is configured to receive a data line and a power line for the electronic speed controller and a data line for the antenna.

In some embodiments, the foot stand further includes a shock absorber connected between another end of the electronic speed controller compartment and another end of the lower cover.

In some embodiments, one end of the shock absorber is inserted in a fixing portion of the electronic speed controller compartment and another end of the shock absorber is inserted in a fixing portion of the lower cover.

In some embodiments, the shock absorber includes a hydraulic damping shock absorber.

In some embodiments, the protection sleeve includes a carbon tube.

In some embodiments, the signal line protection assembly of claim 1 further includes a support member connected to the foot stand. The protection sleeve is completely received in the support member and the foot stand sleeve.

In some embodiments, the foot stand and the foot stand sleeve are first foot stand and first foot stand sleeve, respectively. The signal line protection assembly further includes a second foot stand including a second foot stand sleeve. One end of the protecting sleeve is received in the first foot stand sleeve and another end of the protecting sleeve is received in the second foot stand sleeve.

Also in accordance with the present disclosure, there is provided an aerial vehicle including a vehicle body, an arm extending from the vehicle body, a signal line protection assembly connected to the arm, and a signal line. The signal line protection assembly includes a foot stand and a protection sleeve. The foot stand includes a foot stand sleeve. At least a portion of the protection sleeve is received in the foot stand sleeve. The signal line is received in the protection sleeve.

In some embodiments, the aerial vehicle further includes a propulsion system configured to drive a rotor. The foot stand sleeve includes a bearing member and a receiving portion. A first side of the bearing member is configured to bear the propulsion system. The receiving portion is provided at a second side of the bearing member and configured to receive and fix the protection sleeve.

In some embodiments, the receiving portion is a first receiving portion provided at a first end of the second side of the bearing member. The foot stand sleeve further includes a second receiving portion provided at a second end of the second side of the bearing member.

In some embodiments, the protection sleeve is fixed to the receiving portion by glue provided at a position where the protection sleeve contacts the receiving portion.

In some embodiments, the protection sleeve includes a wire inlet configured to allow the signal line to enter the protection sleeve. The bearing member includes a wire outlet at a position corresponding to an end of the protection sleeve and configured to allow the signal line to be led out of the protection sleeve.

In some embodiments, the foot stand includes an electronic speed controller compartment disposed below the bearing member and configured to receive an electronic speed controller of the aerial vehicle. The receiving portion of the foot stand sleeve is received in the electronic speed controller compartment, such that the protection sleeve is at least partially received in the electronic speed controller compartment.

In some embodiments, the foot stand includes a lower cover below the electronic speed controller compartment. One end of the lower cover is connected with one end of the electronic speed controller compartment. The lower cover includes an antenna compartment configured to receive an antenna for receiving an external signal.

In some embodiments, the protection sleeve is configured to receive a data line and a power line for the electronic speed controller and a data line for the antenna.

In some embodiments, the foot stand further includes a shock absorber connected between another end of the electronic speed controller compartment and another end of the lower cover.

In some embodiments, one end of the shock absorber is inserted in a fixing portion of the electronic speed controller compartment and another end of the shock absorber is inserted in a fixing portion of the lower cover.

In some embodiments, the shock absorber includes a hydraulic damping shock absorber.

In some embodiments, the protection sleeve includes a carbon tube.

In some embodiments, the signal line protection assembly further includes a support member connected to the foot stand. The protection sleeve is completely received in the support member and the foot stand sleeve.

In some embodiments, the foot stand and the foot stand sleeve are first foot stand and first foot stand sleeve, respectively. The signal line protection assembly further includes a second foot stand including a second foot stand sleeve. One end of the protecting sleeve is received in the first foot stand sleeve and another end of the protecting sleeve is received in the second foot stand sleeve.

In some embodiments, the protection sleeve is joined to the arm and extends in a direction perpendicular to an extending direction of the arm.

As compared to the existing technologies, in the present disclosure, at least a portion of the protection sleeve is received in the foot stand sleeve, and the signal line is received in the protection sleeve, such that the signal line is at least partially received within the foot stand sleeve. The signal line is prevented from damages caused by external environment.

DETAILED DESCRIPTION OF EMBODIMENTS

Figure 1:
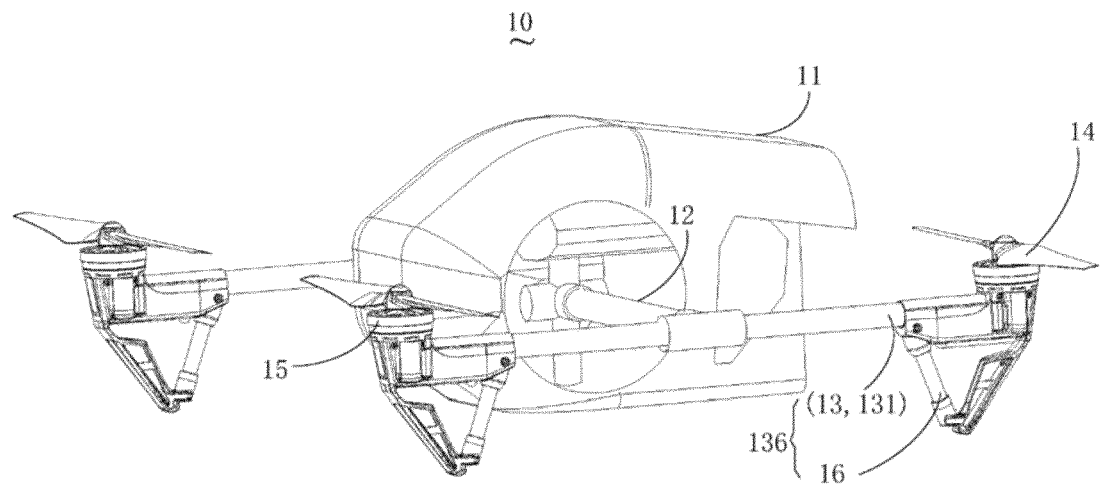
FIG. 1 is a diagram showing a structure of an aerial vehicle in accordance with an embodiment of the present disclosure.
Figure 2:
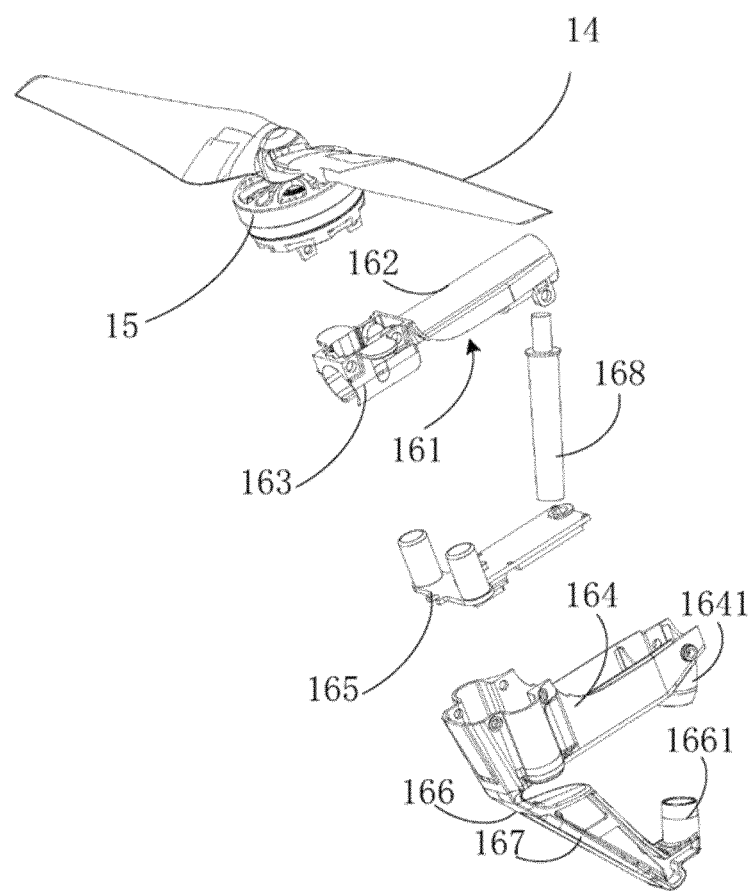
FIG. 2 is an exploded view of a foot stand of FIG. 1.
Figure 3:
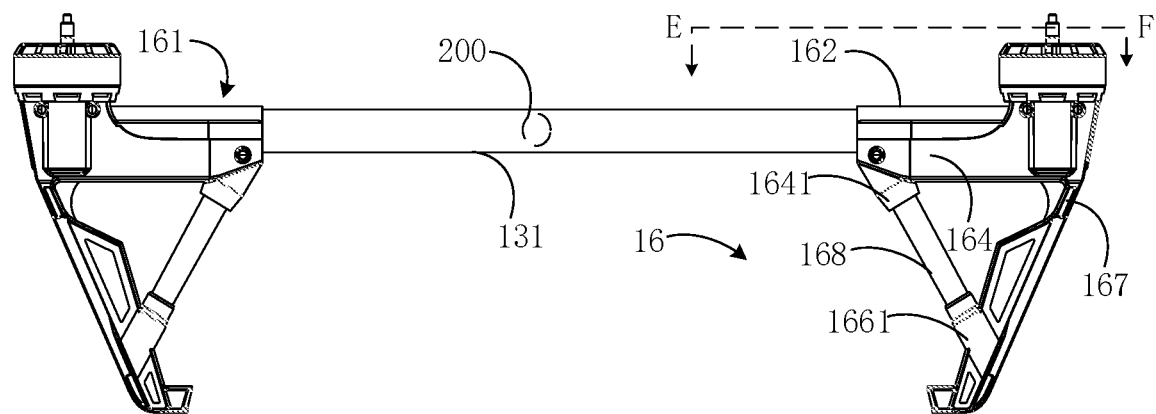
FIG. 3 is a front view of a signal line protection assembly of FIG. 1.
Figure 4:
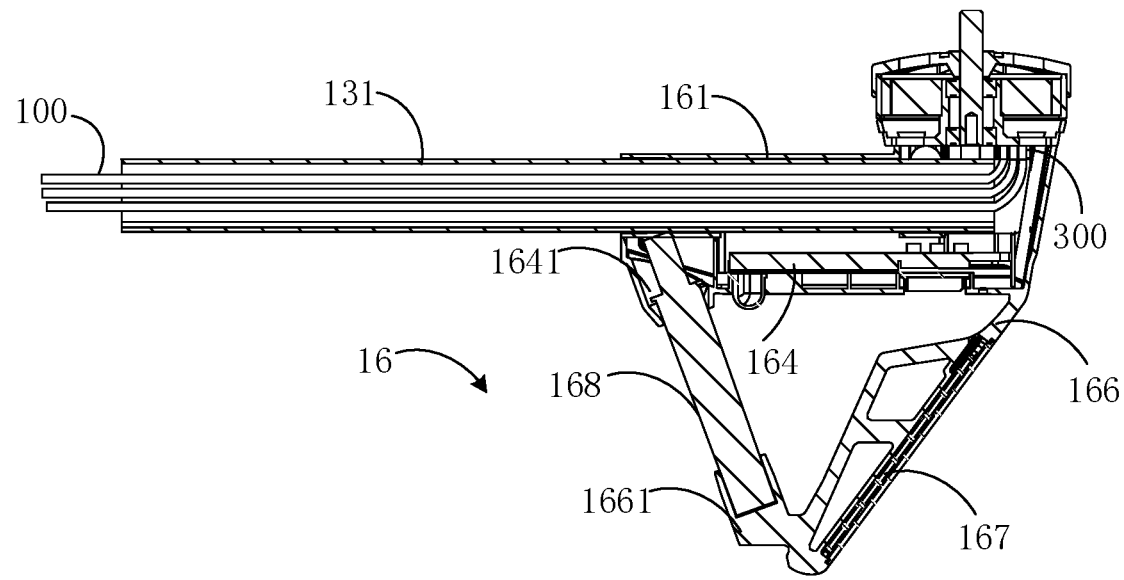
FIG. 4 is a sectional view of a signal line protection assembly along line E-F in FIG. 3.

Refer to FIGS. 1-4. FIG. 1 is a diagram showing a structure of an aerial vehicle in accordance with an embodiment of the present disclosure. FIG. 2 is an exploded view of a foot stand shown in FIG. 1. FIG. 3 is a front view of a signal line protection assembly shown in FIG. 1. FIG. 4 is a sectional view of a signal line protection assembly along line E-F in FIG. 3. As shown in FIG. 1, an aerial vehicle 10 according to the present disclosure comprises a vehicle body 11, at least two arms 12 extending from the vehicle body 11 and support members 13 each extending in a direction perpendicular to an extending direction of one of the arms 12. A rotor 14, a propulsion system 15 of the rotor 14 and a foot stand 16 are provided at each end of each of the support members 13.

In some embodiments, a signal line protection assembly 136 of the aerial vehicle 10 can comprise the support member 13 and the foot stand 16. In these embodiments, the support member 13 can also function as a protection sleeve 131. The protection sleeve 131 can be a carbon tube for receiving a signal line 100 therein.

Referring to FIGS. 2-4, the foot stand 16 comprises a foot stand sleeve 161 for bearing the rotor 14 and the propulsion system 15 that drives the rotor 14. A portion of the protection sleeve 131 can be received in the foot stand sleeve 161. The protection sleeve 131 receives the signal line 100 therein to prevent the signal line 100 from being damaged by external environment. In some embodiments, the signal line 100 is configured to transmit a driving signal to the propulsion system 15.

In some embodiments, since the signal line 100 is received in the protection sleeve 131, the signal line 100 can be effectively protected. Further, placing the signal line 100 in the protection sleeve 131 can save space.

In the embodiments described above, the support member 13 functions as the protection sleeve 131. In other embodiments, the protection sleeve 131 can be provided as a component separate from the support member 13. In these embodiments, the protection sleeve 131 can be entirely received in the support member 13 and the foot stand sleeve 161.

In some embodiments, the foot stand sleeve 161 can comprise a bearing member 162 and a receiving portion 163. A first side of the bearing member 162 is configured to bear the rotor 14 and the propulsion system 15. The receiving portion 163 is provided at a second side, e.g., the side opposite the first side, of the bearing member 162 for receiving and fixing the protection sleeve 131. In some instances, at least two receiving portions 163 can be provided to securely fix the protection sleeve 131. The receiving portions 163 can be provided at two ends of the second side of the bearing member 162, respectively.

In some instances, glue can be provided at a position where the protection sleeve 131 contacts the receiving portion 163 so as to further fix the protection sleeve 131. In some embodiments, glue can also be provided at the second side of the bearing member 162 to further fix the protection sleeve 131. As compared to conventional structures in which screws and the like are employed, the weight of apparatus is reduced by fixing the protection sleeve 131 using the receiving portion 163 and the glue.

The embodiment shown in FIG. 1 is a quad-rotor aerial vehicle, which comprises two supports 13 and four foot stands 16. The four foot stands 16 are respectively provided at two ends of each of the two supports 13. According to the present disclosure, each support member 13 and two corresponding foot stands 16 constitute one signal line protection assembly. In the present disclosure, description is made with respect to such one signal line protection assembly, but it should be noted that the description also applies to the other signal line protection assembly. As shown in FIGS. 2-4, the two ends of the protection sleeve 131 correspond to and are received in the foot stand sleeves 161 of the two foot stands 16, respectively. In some instances, as described above, each foot stand sleeve 161 includes two receiving portions 163 provided at two ends of the foot stand sleeve 161, respectively. Each end of the protection sleeve 131 is inserted into the receiving portion 163 at one end of the corresponding foot stand sleeve 161 and reaches the receiving portion 163 at the other end of the corresponding foot stand sleeve 161.

The protection sleeve 131 is provided with a wire inlet 200. The bearing member 162 of the foot stand sleeve 161 is provided with a wire outlet 300 at a position corresponding to the end of the protection sleeve 131. The signal line 100 can be routed through the protection sleeve 131 from the wire inlet 200 to the end of the protection sleeve 131, and further led out to the propulsion system 15 through the wire outlet 300.

In some embodiments, the wire inlet 200 of the protection sleeve 131 is provided at a joint of the support member 13 and the arm 12.

In some embodiments, as shown in the figures, the foot stand 16 can be provided with an electronic speed controller compartment 164 for receiving an electronic speed controller 165 of the aerial vehicle 10. The electronic speed controller 165 controls a rotating speed of a motor of the propulsion system 15 by varying voltage. The bearing member 162 of the foot stand sleeve 161 can be disposed on the electronic speed controller compartment 164, and the receiving portion 163 of the foot stand sleeve 161 can be received in the electronic speed controller compartment 164, such that the protection sleeve 131 can be received in the electronic speed controller compartment 164 to save space.

The foot stand 16 can further comprise a lower cover 166 below the electronic speed controller compartment 164. A first end of the lower cover 166 is connected with a first end of the electronic speed controller compartment 164. The lower cover 166 can be provided with an antenna compartment 167 configured to receive an antenna for receiving an external signal. The antenna compartment 167 can prevent the antenna from damages caused by the external environment. In some embodiments, the antenna comprises an antenna for image transmission.

In some embodiments, the signal line 100 can comprise a power line and a data line for the electronic speed controller 165 and a data line for a control antenna. That is, the protection sleeve 131 can receive therein the power line and the data line for the electronic speed controller 165 and the data line for the control antenna.

The foot stand 16 can further comprise a shock absorber 168. The shock absorber 168 can be connected between a second end of the electronic speed controller compartment 164 and a second end of the lower cover 166. The shock absorber 168, the electronic speed controller compartment 164, and the lower cover 166 form a triangular structure. In some instances, the second end of the electronic speed controller compartment 164 is provided with a fixing portion 1641, and the second end of the lower cover 166 is provided with another fixing portion 1661. The two ends of the shock absorber 168 are inserted in a sleeve structure of the fixing portion 1641 and a sleeve structure of the fixing portion 1661, respectively. The shock absorber 168 can be a hydraulic damping shock absorber.

According to the present disclosure, the signal line and the antenna can be effectively protected by being received in the protection sleeve and the antenna compartment, respectively.

A weight of the aerial vehicle can be effectively reduced by fixing the protection sleeve and the foot stand sleeve using glue.

While embodiments of the present disclosure have been shown and described above, it will be appreciated by those of ordinary skill in the art that the scope of the disclosure is not be limited thereto. It is intended that any equivalent modifications or variations made by those of ordinary skill in the art to the disclosure be within the scope of the invention as defined in the following claims.

What is claimed is:

1. A signal line protection assembly of an aerial vehicle comprising:
 a foot stand including:
 a foot stand sleeve; and
 a lower cover including an antenna compartment configured to receive an antenna of the aerial vehicle; wherein the antenna compartment is enclosed within a structure of lower cover; and
 a protection sleeve configured to receive a signal line, at least a portion of the protection sleeve being received in the foot stand sleeve; wherein the signal line includes a data line for the antenna.

2. The signal line protection assembly of claim 1, wherein the foot stand sleeve includes:
 a bearing member, a first side of the bearing member being configured to bear a propulsion system; and
 a receiving portion at a second side of the bearing member and configured to receive and fix the at least a portion of the protection sleeve.

3. The signal line protection assembly of claim 2, wherein the protection sleeve is fixed to the receiving portion by glue provided at a position where the protection sleeve contacts the receiving portion.

4. The signal line protection assembly of claim 2,
 wherein the foot stand is a first foot stand and the foot stand sleeve is a first foot stand sleeve;
 the signal line protection assembly further comprising:
 a second foot stand including a second foot stand sleeve;
 wherein two ends of the protection sleeve are received in the first foot stand sleeve and the second foot stand sleeve, respectively.

5. The signal line protection assembly of claim 4, wherein:
 the bearing member is a first bearing member configured to bear a part of the propulsion system;
 the second foot stand sleeve includes a second bearing member;
 the protection sleeve includes a wire inlet;
 the first bearing member and the second bearing member each include a wire outlet at a position corresponding to one end of the protection sleeve; and
 the signal line enters the protection sleeve through the wire inlet, exists the protection sleeve from the ends of the protection sleeve, and further exists through the wire outlets to the propulsion system.

6. The signal line protection assembly of claim 2, wherein the foot stand further includes an electronic speed controller compartment below the bearing member and configured to receive an electronic speed controller of the aerial vehicle.

7. The signal line protection assembly of claim 6, wherein the receiving portion is received in the electronic speed controller compartment.

8. The signal line protection assembly of claim 6, wherein the lower cover is below the electronic speed controller, and one end of the lower cover is connected with one end of the electronic speed controller compartment.

9. The signal line protection assembly of claim 8, wherein the foot stand further includes a shock absorber connected between another end of the electronic speed controller compartment and another end of the lower cover.

10. The signal line protection assembly of claim 6, wherein the signal line further includes a data line and a power line for the electronic speed controller.

11. An aerial vehicle, comprising:
a propulsion system; and a
signal line protection assembly including:
a foot stand including:
a foot stand sleeve; and
a lower cover including an antenna compartment configured to receive an antenna of the aerial vehicle; wherein the antenna compartment is enclosed within a structure of lower cover; and
a protection sleeve configured to receive a signal line, at least a portion of the protection sleeve being received in the foot stand sleeve; wherein the signal line includes a data line for the antenna.

12. The aerial vehicle of claim 11, wherein the foot stand sleeve includes:
a bearing member, a first side of the bearing member being configured to bear the propulsion system; and
a receiving portion at a second side of the bearing member and configured to receive and fix the at least a portion of the protection sleeve.

13. The aerial vehicle of claim 12, wherein the protection sleeve is fixed to the receiving portion by glue provided at a position where the protection sleeve contacts the receiving portion.

14. The aerial vehicle of claim 12, wherein:
the foot stand is a first foot stand and the foot stand sleeve is a first foot stand sleeve;
the signal line protection assembly further includes a second foot stand including a second foot stand sleeve; and
two ends of the protection sleeve are received in the first foot stand sleeve and the second foot stand sleeve, respectively.

15. The aerial vehicle of claim 14, wherein:
the bearing member is a first bearing member configured to bear a part of the propulsion system;
the second foot stand sleeve includes a second bearing member;
the protection sleeve includes a wire inlet;
the first bearing member and the second bearing member each include a wire outlet at a position corresponding to one end of the protection sleeve; and
the signal line enters the protection sleeve through the wire inlet, exists the protection sleeve from the ends of the protection sleeve, and further exists through the wire outlets to the propulsion system.

16. The aerial vehicle of claim 12, wherein the foot stand further includes an electronic speed controller compartment below the bearing member and configured to receive an electronic speed controller of the aerial vehicle.

17. The aerial vehicle of claim 16, wherein the receiving portion is received in the electronic speed controller compartment.

18. The aerial vehicle of claim 16, wherein the lower cover is below the electronic speed controller, and one end of the lower cover is connected with one end of the electronic speed controller compartment.

19. The aerial vehicle of claim 18, wherein the foot stand further includes a shock absorber connected between another end of the electronic speed controller compartment and another end of the lower cover.

20. The aerial vehicle of claim 16, wherein the signal line further includes a data line and a power line for the electronic speed controller.

* * * * *